United States Patent [19]

Dotsko et al.

[11] 4,330,284
[45] May 18, 1982

[54] CAPACITIVE SENSING DEVICE

[75] Inventors: Martin Dotsko; Kadam S. Lakshminarayanasetty, both of Binghamton, N.Y.

[73] Assignee: The Singer Company, Binghamton, N.Y.

[21] Appl. No.: 42,760

[22] Filed: May 29, 1979
(Under 37 CFR 1.47)

[51] Int. Cl.³ .............................................. G09B 9/08
[52] U.S. Cl. ...................................... 434/38; 324/61 P
[58] Field of Search ............... 35/12 N, 25; 324/61 R, 324/61 P; 358/104

[56] References Cited

U.S. PATENT DOCUMENTS

| | | | |
|---|---|---|---|
| 3,555,534 | 1/1971 | Akers et al. | 324/61 R |
| 3,805,150 | 4/1974 | Abbe | 324/61 R |
| 4,067,225 | 1/1978 | Dorman et al. | 324/61 R |

FOREIGN PATENT DOCUMENTS

1527413  10/1978  United Kingdom ............... 35/12 N

Primary Examiner—Vance Y. Hum
Attorney, Agent, or Firm—Douglas M. Clarkson; Jeff Rothenberg

[57] ABSTRACT

A capacitive sensing device for detecting the presence of conducting and nonconducting objects with the distance between sensing tip and object remaining nearly constant regardless of their size or mass is disclosed. The device is particularly useful with the camera optical probe of an aircraft simulator for training pilots, and is mounted on the camera probe such that it generates a capacitance at its output which varies with the distance between the camera probe and objects on a terrain model board as the probe travels about the model board. Thus, if the optical probe approaches too close to an object, (especially an object outside the field of view of the pilot trainee) it generates a control signal to prevent the optical probe from crashing into such an object. The probe which can sense both nonmetallic and metallic objects comprises a capacitive sensing probe for sensing metallic objects which is of standard design in combination with a toroidal-shaped metallic member positioned around the standard probe at the sensing end. The capacitance of the toroidal-shaped member with respect to a target object, (either metallic or nonmetallic) is tuned to be substantially equal to the capacitance of the standard probe with respect to the same target object when the combination probe and toroidal members are at a selected distance from the target object.

5 Claims, 17 Drawing Figures

PRIOR ART

FIG. 1A

PRIOR ART

FIG. 1B

PRIOR ART

FIG. 2A

PRIOR ART

CAPACITIVE SENSING DEVICE

BACKGROUND OF THE INVENTION

This invention relates to a capacitive sensing device and more particularly to a device used to sense the presence of conducting and nonconducting objects in the vicinity of the path of a camera optical probe during its movement about a terrain model board of a simulator complex such as is used in pilot training.

Visual display systems used with aircraft simulation and comprising a closed-circuit television system in which a television camera is moved about a three-dimensional terrain model have gained widespread use in the field of aircraft simulation. Apparatus and techniques for controlling camera movement as well as transmitting and displaying the image of the terrain model are disclosed in U.S. Pat. Nos. 2,959,779; 3,052,753 and 3,670,426. The three-dimensional model board which is scanned by the TV camera as the camera follows a simulated course of flight determined by the student pilot as the student pilot "flies" the simulation aircraft is fashioned painstakingly with rigorous adherence to correct scale factors so that the trainee can properly judge altitude, altitude rates, slant range, closure rates, etc. The terrain model generally represents a large section of terrain that may include mountains, rivers, buildings, airports, runways, etc., and may have an overall dimension on the order of 20 feet by 40 feet (6.1 by 12.2 meters). The scale of such a terrain model board is so small that a 20 by 40 foot model might easily represent a section of terrain on the order of 6 miles by 12 miles (9.66 by 19.31 kilometers). Because of this large scale factor, it will be appreciated that if a pilot trainee was performing a maneuver that would in real life bring his aircraft within 200 feet (61 meters) of the ground, the television probe or lens would be "flying" about the model board at about 1.6 inches (4.1 centimeters). Similarly, if the pilot were to be performing a maneuver such as landing, that would bring his eyepoint within 20 feet (6 meters) of the ground, the television probe or lens would only be 0.16 (4.1 millimeters) of an inch away from a model board. Thus, it can be seen that as the camera probe moves rapidly along the model board at such close distances, a slight mistake on the part of the trainee pilot or an irregularity in the model board could result in the probe making contact with or crashing into the model board. Such crashing almost always results in damage to either the camera probe or the model board. Therefore, during movement of the optical camera probe over the terrain model board, it is important to sense the presence of nearby objects to prevent the probe, as controlled by the trainee pilot, from crashing into such objects which are not within the field of view of the simulator operator.

SUMMARY OF THE INVENTION

Accordingly, it is an object of this invention to provide a sensing device which assists in protecting the optical camera probe during its moving surveillance of the terrain board of a simulator system.

A further object of the invention is to provide a sensing device which senses the presence of objects in the path of the moving camera probe.

Yet another object of the invention is to provide a sensing device which senses the presence of conducting and non-conducting objects.

Still another object is to provide a sensing device which substantially senses large and small objects when the distance between the sensing tip and object remain nearly constant irregardless of object size.

Other objects and advantages will become apparent upon reading the following summary, and detailed description together with the drawings.

In accordance with various features of the invention, a capacitive sensing system is provided which is equally sensitive to metallic and nonmetallic, small and large target objects. The system comprises a capacitive sensing device having a sensing element which is fabricated from an electrically conducting material. Electrically connected to this sensing device is a monitoring circuit which monitors changes in the capacitance between the sensing element and the target object. A capacitance modifying element is electrically insulated from the sensing element and is located with respect to the sensing element such that the capacitance sensing system is responsive to the distance between said sensing element and said target objects, but has substantially reduced response with respect to the conductivity and size of the target object.

DESCRIPTION OF THE INVENTION

Figures 1A, 1B:
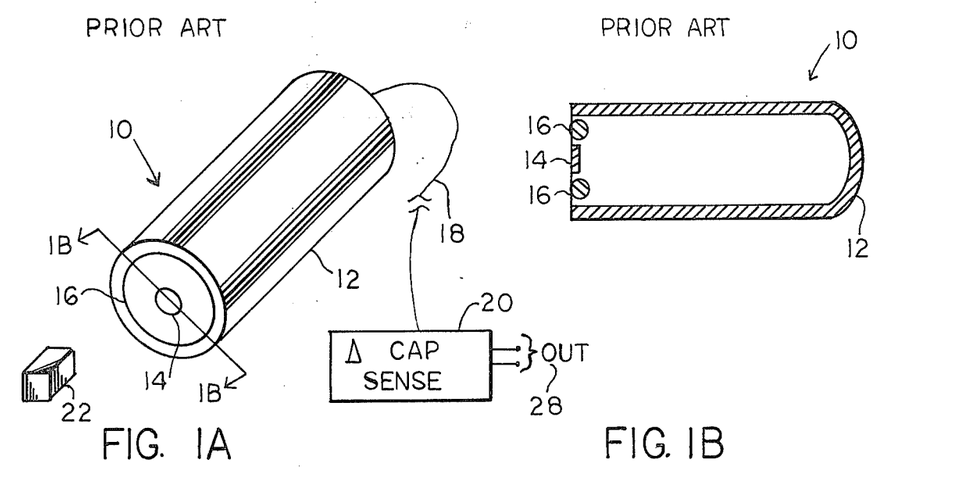
FIGS. 1A and 1B, and FIGS. 2A and 2B show prior art capacitive sensing devices which are commercially available.

Referring now to FIGS. 1A and 1B, and FIGS. 2A and 2B, there are shown two examples of prior art capacitance sensing probes shown generally at 10 such as may be purchased commercially and which are typically used to sense metallic objects. It will be appreciated that equivalent portions of the probes as shown in FIGS. 1A and 1B, and 2A and 2B as well as subsequent Figures are designated by common reference numbers. The probe of FIGS. 1A and 1B is of the type such as is available from Lion Precision Corporation (Model 300-4A) and includes outside metallic shield 12 which is connected to ground, probe sensing element 14 and a probe outer ring 16. Connected to probe 10 by cable 18 is monitor circuitry 20. Thus, when the end of sensor 10 containing sensing element 14 and ring 16 approaches a metallic object 22 the capacitance between the metallic object and the sensor 10 changes since the thickness of the dielectric material (ie. air) is decreased. This change is sensed by circuitry 20. Thus, if the probe 10 gets within a preselected distance to metallic object 22, a trigger or threshold circuit contained in monitor circuitry 20 will be energized.

Figures 2A, 2B:
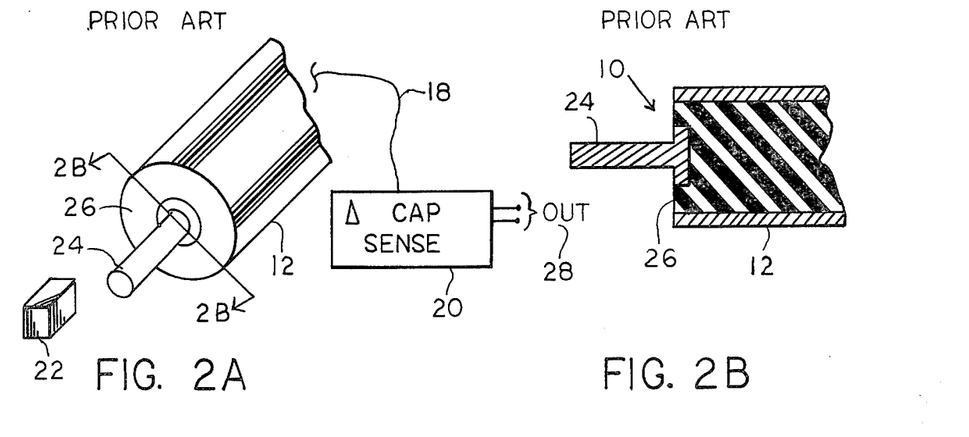

Probe 10 of FIGS. 2A and 2B is of the type such as is available from Automatic Timing and Controls Company (Proximatrol Series 7053). Probe 10 includes a metallic sensing tip 24 embedded in an insulating material 26, which insulating material electrically isolates tip probe 24 from the metallic case 12 of the probe. In the same manner as that discussed above with respect to FIGS. 1A and 1B, as tip 24 of FIG. 2 approaches a metallic object 22 the capacitance between the metallic object and the tip changes. Thus, it can be seen that both the probes of FIGS. 1A and 1B, and FIGS. 2A and 2B include the circuitry 20 which is tuned so that as the probe is brought within a preselected distance to the metallic object 22, the change in capacitance triggers the circuitry 20 which then provides an output such as at 28 which output may be used for various purposes such as setting off a warning system or providing a readout.

Figure 3A:
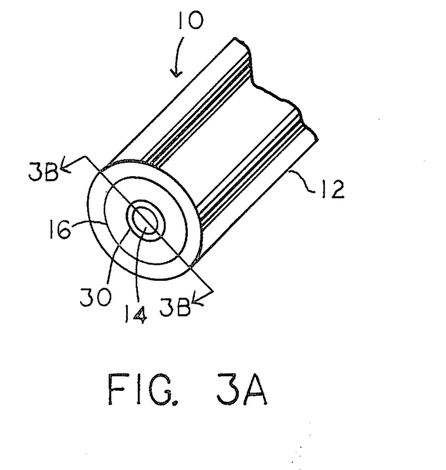
FIGS. 3A and 3B show a modification to the prior art probe of FIGS. 1A and 1B in accordance with the present invention.
Figure 3B:
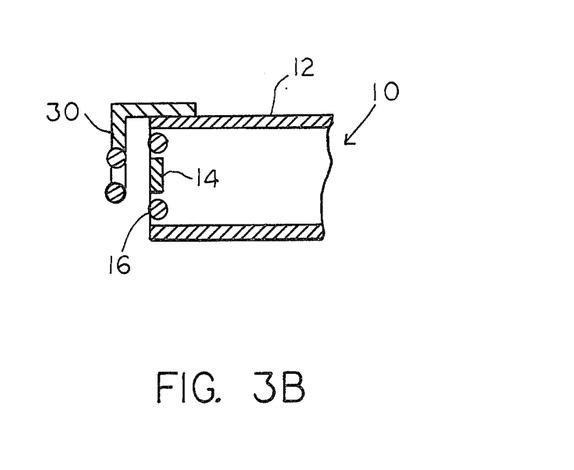
Figure 4:
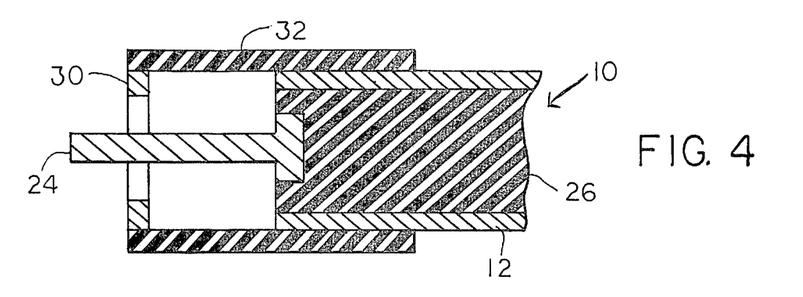
FIG. 4 shows a modification to the prior art probe of FIGS. 2A and 2B in accordance with the present invention.
Figure 5A:
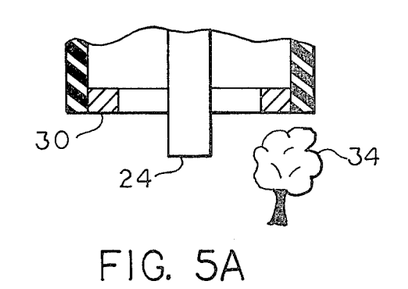
FIGS. 5A and 5B represent a modified probe of FIG. 4, and how such a probe can sense simulated objects at an axial distance from the probe as well as objects located to the side of the probe.
Figure 5B:
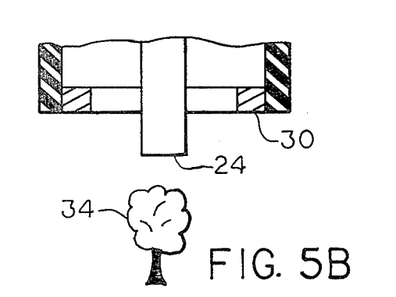

FIGS. 3A and 3B show a modification to the probe of FIGS. 1A and 1B which modification includes the addition of ring 30 which is located a preselected distance away from the sensing end of probe 10. The addition of ring 30 to the probe results in the new and improved capability of the probe being able to sense nonmetallic as well as metallic objects. Likewise, FIG. 4 shows modifications to the probe of FIGS. 2A and 2B according to the present invention, which modifications include the addition of an insulating tube 32. Tube 32 supports added ring 30 at a selected location along the axial length of probe tip 24. Ring 30 of both FIGS. 3A and 3B, and FIG. 4 is electrically connected to shield 12. Experiments involving the modified probes of FIGS. 3A and 3B, and FIG. 4 clearly show that these modified probes are capable of sensing nonmetallic object as well as metallic objects. For example, the modified probe shown in FIG. 4 is able to sense the presence of nonmetallic objects immediately adjacent the probe tip 24 as well as nonmetallic objects to the side of the tip such as the simulated tree 34 shown in FIGS. 5A and 5B, respectively with the distance between ring, tip and objects remaining nearly constant. As is discussed in detail, and as will become clear hereinafter, the associated circuitry of the standard probe may also require modification to accommodate the capacitance sensitivity resulting from the added ring.

To aid in understanding the importance of this invention, the tremendous cost involved, the dimensions and the other physical aspects of the present invention, it will be appreciated that a terrain model board used in an aircraft simulator could typically have a model to real life ratio such that a 20 foot by 40 foot (6.1 meters by 12.2 meters) model board might well represent a six by twelve mile geographical area. Furthermore, it should be appreciated that the viewing end of an optical probe would typically have a diameter of approximately 0.75 inches (1.9 centimeter) and may well have to approach the terrain model board during landing exercises no less than 0.03 inches (0.76 millimeters) which would represent approximately 4 feet (1.22 meters) from the runway. Consequently, it will be appreciated that the capacitive sensing probe of this invention also has very small dimensions. Thus, referring again to FIG. 4 according to one embodiment of the present invention, the outside diameter of the sensing probe 10 which includes the outside diameter of added ring 30 will be approximately 0.250 inches (6.3 millimeters). The added ring 30 will have an inside diameter of approximately 0.187 inches (4.75 millimeters). Probe tip 24 itself in such an embodiment would be approximately 1.15 inches (2.92 centimeters) long and 0.052 inches (1.32 millimeters) in diameter.

The location of ring 30 on the above discussed probe was arrived at empirically by axially varying the position of added ring 30 relative to the end of the probe tip 24 until objects at a preselected distance of 0.030 inches (0.76 millimeters) generated substantially the same capacitance no matter what the size of the object [including 0.01 square inch (0.65 square millimeters) to 2 square inch (129 square millimeters)]. Thus, in the experiment, the capacitive probe was triggered when it approached the target object within 0.030 inches (0.76 millimeter) regardless of the size of the target object or whether the target object was metallic or nonmetallic. Other tests showed that without the added ring 30, the capacitive probe was triggered at distances between the probe and the target object varying from 0.03 inches (0.76 millimeter) to nearly 2 inches (5.08 centimeters) depending upon the respective size and dielectric characteristics of the target object.

The accuracy of this empirical data arrived at experimentally, has been proven mathematically as follows. It is readily understood by those skilled in the art that the capacitance between two plates may be determined by the formula:

$$C = 0.225 \, K \frac{(N-1)A}{t} \text{ picofarads} \tag{1}$$

C = capacitance in picofarads
K = the dielectric constant between the plates
A = the area in square inches of one plate
N = the number of plates, and
t = the thickness of the dielectric in inches.

Therefore, with respect to the probe tip discussed above which had a diameter of 0.052 inches (1.32 millimeters) at a preselected target distance of 0.030 inches (0.76 millimeters) between the probe tip and the terrain model board it will be appreciated that the dielectric is air and therefore $$C = 0.225 \frac{(2-1)A}{0.03} \text{ picofarads} \tag{2}$$

which may be reduced to $$C = 0.225 \, (A/0.03) \text{ picofarads}. \tag{3}$$

Since A equals the cross section of the probe tip which has a given diameter of 0.052 inches, $$A = 3.14 \times (0.026)^2. \tag{4}$$

Combining equations (3) and (4);

$$C = 0.225 \times (0.00212/0.030) \text{ picofarads.} \quad (5)$$

Equation (5) then reduces to $$C = (0.225)(0.0706) \text{ such that}$$

$$C = 0.01588 \text{ picofarads.} \quad (6)$$

Figure 13:
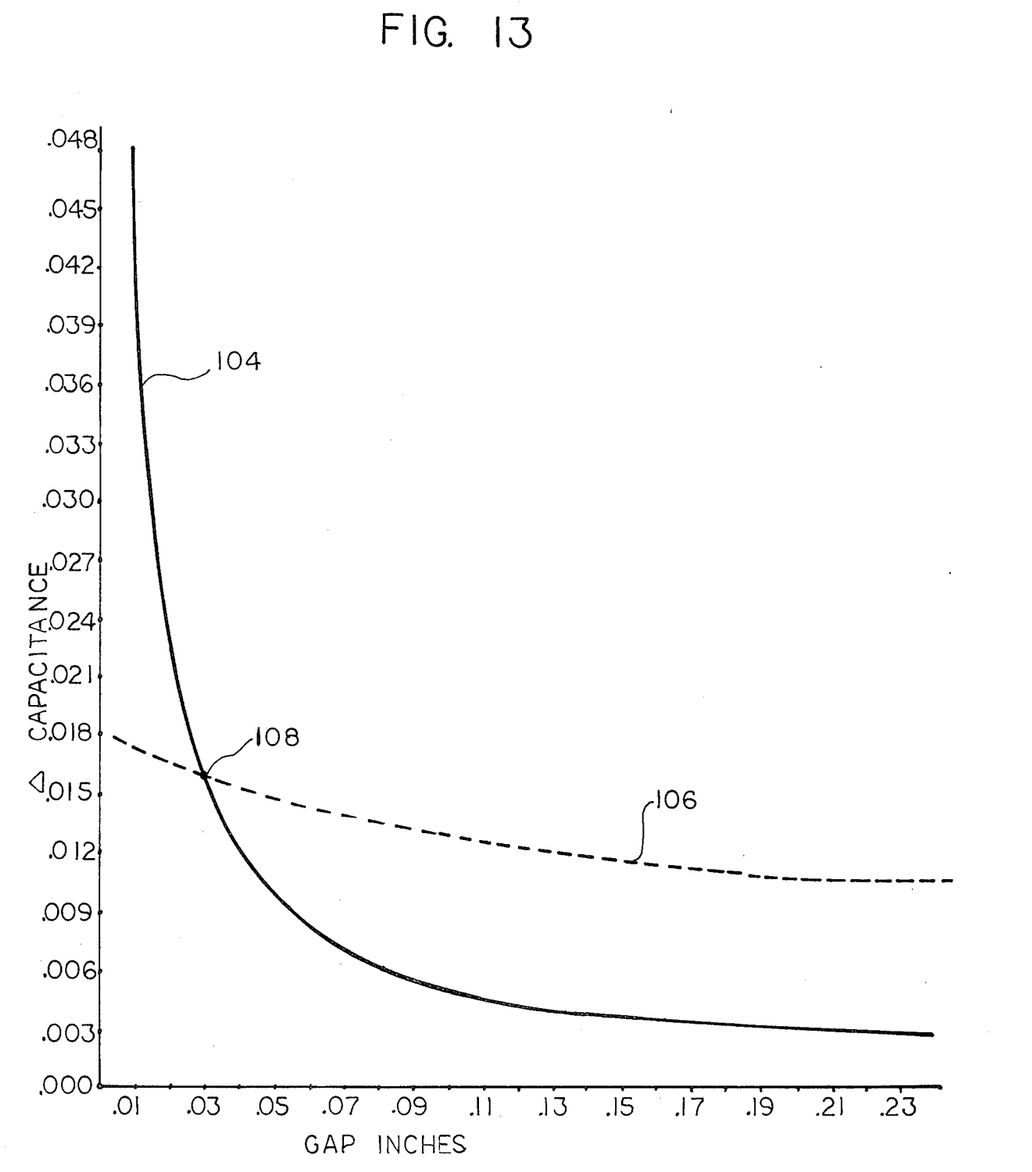
FIG. 13 is a graphic plot that shows the capacitance variations with probe gap variations of the modified probe of FIG. 4.

By requiring that the capacitance between the probe tip and the terrain model board be equal to the capacitance between added ring 30 and the model board, it will be appreciated that the change of capacitance between added ring and terrain model board will remain essentially constant while the probe tip capacitance changes will dominate and vary greatly about the design center of 0.030 inch (0.76 millimeter) gap as the distance between probe tip and terrain model board is varied (see FIG. 13) and that this value of $C = 0.01588$ picofarads may be substituted into the equation (1) above to determine the area (A') of the added ring. The graph of FIG. 13 shows the relationship of the change in the capacitance of the ring and probe tip with respect to the gap between the probe tip and model board. Curve 104 shows the change in the capacitance of the probe tip, and curve 106 shows the change in capacitance of the ring. The point 108 where curves 104 and 106 cross is the design center. Therefore, A' equals the area of the added ring in square inches and t' equals the thickness of the dielectric in inches between the added ring and the terrain model board. Thus, if we assume that the added ring is 0.300 inches (7.62 millimeters) from the end of the probe tip 24 as was the case in the experiments discussed above, the equation (1) may be reduced to:

$$.0158 = 0.225 \times \frac{A'}{0.3 + 0.03}. \quad (7)$$

Combining and rearranging the terms, $$A' = 0.330 \times (0.0158/0.225). \quad (8)$$

Finally, $$A' = 0.0231 \text{ square inches. (1.49 square millimeters).} \quad (9)$$

Thus, assuming added ring 30 to have a inside diameter of 0.187 inches (which was the case of the ring used in the experiment) the outside diameter necessary to produce an overall square inch value of 0.0231 may be computed from the equation $$A = 0.7854(D+d)(D-d) \quad (10)$$

Wherein:
(D) is the outside diameter of the added ring 30 and
(d) is the inside diameter.
Using the surface area of 0.0231 square inches calculated above at equation (9) and rearranging terms we obtain $$0.0231 = 0.7854(D^2 - d^2). \quad (11)$$

This may be arranged to $$(0.0231/0.7854) = D^2 - (0.187)^2 \quad (12)$$

Thus, simplifying and further arranging of terms yields $$D^2 = 0.029412 + 0.034969 \quad (13)$$

Taking the square root of this value $$D = \sqrt{0.064381} \text{ and} \quad (14)$$

$$D = 0.2537 \text{ inches (6.44 millimeters)} \quad (15)$$

Figure 6:
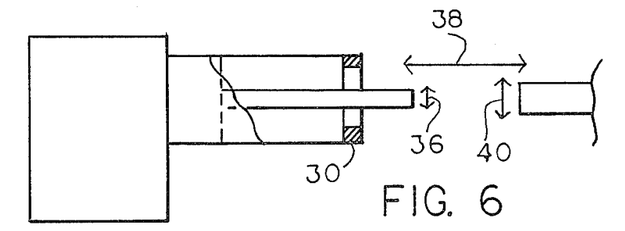
FIG. 6 shows the probe of FIG. 4 as it was used experimentally to determine the smallest metallic and the smallest nonmetallic objects which could be sensed by the modified probe.

Thus, recalling from the empirical data that the outside diameter was 0.250 inches (6.35 millimeters) it can be seen that the above calculations of the size of the added ring 30 correspond almost exactly to the empirically derived size. It will be appreciated that the response of the ideal sensor at any selected distance would not be different for metallic and nonmetallic objects no matter their size. Thus, the sensor would always trigger a warning if it was moved closer to an object than the preset limit. Experimentation has shown that the probe of the present invention approached this ideal situation close enough to substantially eliminate dangerous collisions. For example, referring now to FIG. 6, is we assume a probe tip 24 of 0.052 inch (1.32 millimeter) diameter as was discussed above, and is indicated by arrow 36, and a preselected distance between object and probe tip of approximately 0.06 inch (1.52 millimeter) as is represented by arrow 38, it has been found that the diameter of a metallic object indicated by arrow 40 that will trigger the probe is approximately 0.015 inches (0.38 millimeter) whereas for a nonmetallic object the minimum diameter is approximately 0.094 inches (2.39 millimeters). The dimension of the smallest nonmetallic object, therefore, which can be sensed by the probe of this invention is larger than the smallest metallic object, but still so small that if it is present on the terrain model board it no longer presents a dangerous collision problem for the probe. From the above discussion, it can be seen that a capacitive probe which is sensitive to both metallic and nonmetallic objects with the distance between probe tip and object remaining nearly constant has been disclosed.

Figure 7:
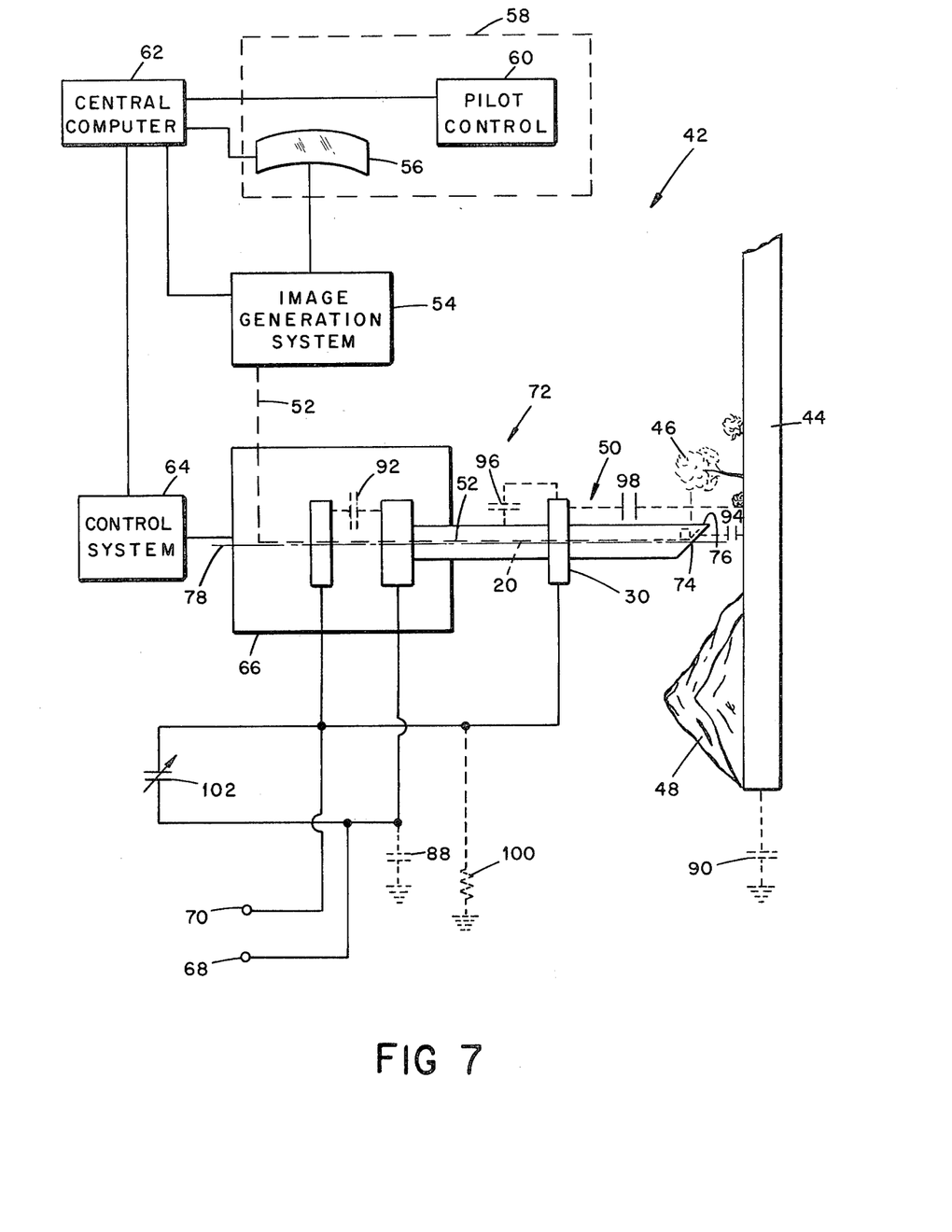
FIG. 7 is a diagrammatic illustration of a camera model simulation system having a capacitive sensing device incorporating various features of this invention.

Referring now to FIG. 7, a simulation system used in connection with training pilots is indicated generally at 42 and includes a terrain model board 44 upon which terrain having preselected contours and objects such as a tree 46 and a hill 48 are provided. The model board 44 is viewed through an optical camera probe 50 which transmits a picture of the terrain along the optical path 52 to an image generation system 54 such as a TV camera. The output of the image generation system 54 is fed to a screen 56 or the like, disposed in the simulator 58, which produces a moving picture of the terrain on model board 44. A pilot within the simulator 58 which is in the form of an airplane cockpit, for example, actuates the controls 60 responsive to the picture on the screen for guiding the aircraft which is really probe 50 over the terrain model board 44 to simulate flight. More specifically, the output of the pilot control is fed through a central computer 62 to control system 64 which controls the movement of the camera probe head assembly 66 and consequently the camera probe 50.

One problem with a simulator system employing an optical camera probe of the type shown in FIG. 7, is the danger of crashing the probe into objects on the model board 44; particularly objects which may be out of view of the pilot. Such objects may be trees, hills, or the walls of buildings on the terrain model board. In this connection, and according to this invention, the capacitive sensing device discussed heretofore is combined with optical probe 50. The illustrated device of FIG. 7 is particularly adapted for sensing objects laying in the path of the probe but out of view of the pilot trainee such that a control signal can responsively be generated and fed to the central computer 62, for example, to prevent the control system 64 from crashing the very expensive camera optical probe into terrain objects. To this end, the combined optical probe and capacitive sensing device 50 acts as one plate of a capacitor while the model board acts as the other plate. Consequently, a signal is generated at the device output terminals 68 and 70 which varies with the position of the sensing device with respect to certain objects on the terrain model board. More specifically, the sensing device 72 includes elongated probe 50. Probe 50 is substantially (circular in cross-sectional outline) and carries certain elements of the optical path 52, such as prism 74 at its end portion 76. The probe 50 is substantially tubular and receives various of the elements of the optical path 52 such as lenses and their mounts, for example. Preferably, probe 50 is fabricated from a conductive material and is carried by the camera probe head assembly 66. Prism 74 located within probe 50 is positioned so that it can view a scene perpendicular to axis 78. Since optical probe 50 also serves as a portion of the capacitive sensing device in this embodiment, it will be appreciated that the conductive case of probe 50 should be electrically insulated from head assembly 66.

Figure 8:
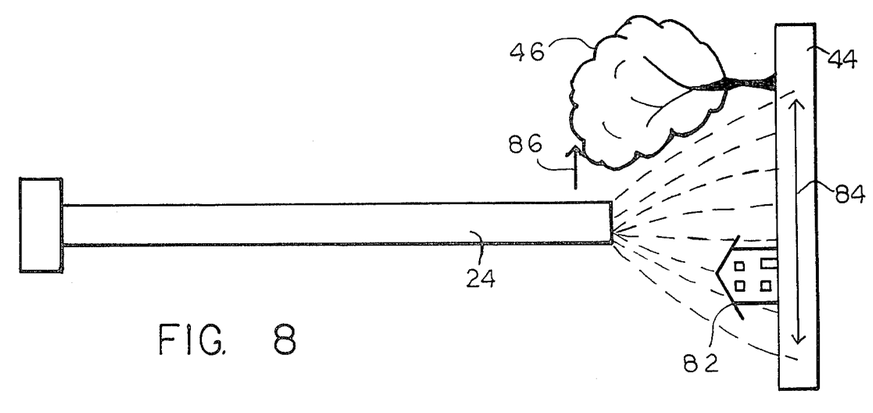
FIG. 8 illustrates the sensing capabilities of the unmodified probe of FIGS. 2A and 2B.

Therefore the combination probe 50 of FIG. 7 without added ring 30 can be compared to the probe discussed heretofore with respect to FIGS. 2A and 2B. Under normal conditions, field lines extend between the end portion 80 of the elongated probe 50 and terrain model board 44. As shown in FIG. 8, the probe of FIG. 2A and 2B is such that an object such as shed 82 disposed on the model board 44 will alter only slightly the dielectric constant between the member 24 and board 44 such that the capacitance between these elements varies only slightly with the presence of an object in the area designated by arrow 84. It will be noted, however, even larger and closer objects laying in the path of movement (represented by arrow 86) of the moving probe 24 such as tree 46 have little, if any, effect on the equivalent capacitance between the probe 24 and model board 44.

Figure 9:
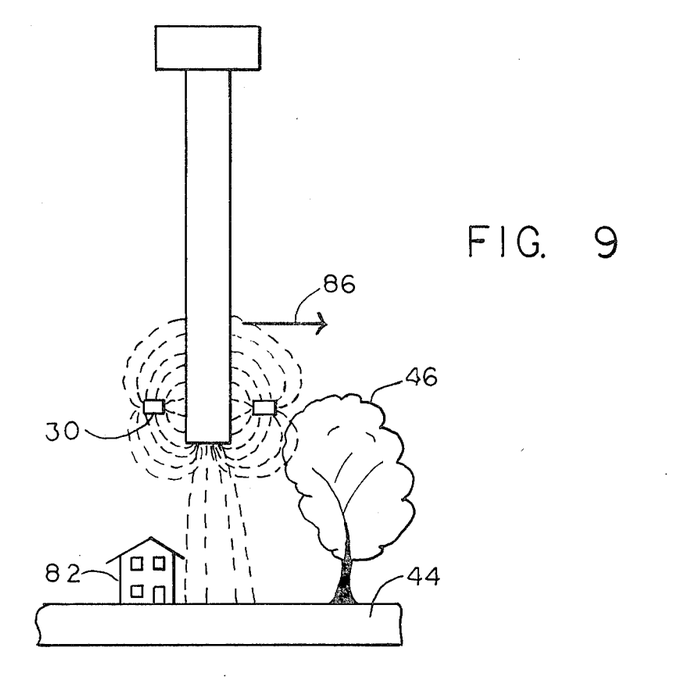
FIG. 9 illustrates the sensing capabilities of a modified probe of FIG. 4.

In order to enhance the capacitive sensing of objects not within area 84, the lines of the electric field generated by the device 24 need to extend into the objects. To this end, as was discussed with respect to FIGS. 4 and 6, ring 30 is added to the combination probe 50 to shift field lines into areas further removed from axis 78 such that the capacitance between probe 50 and model board 44 will vary responsive to the presence of objects not within area 84. This is shown more clearly in FIG. 9. The size of ring 30 (FIG. 7) is selected such that at a preselected distance between the optical probe and a target object such as tree 46, the capacitance between the tip 76 of probe 50 and the target object 46 and the capacitance between the ring 30 and the target object 48 and terrain model board 44 are substantially equal.

As an example, assuming that optical probe 50 (FIG. 7) has a diameter of approximately ¾ of an inch (1.9 centimeter), that the added ring 30 is ½ inch (1.27 centimeter) from the end 76 of probe 50, that the inside diameter of added ring 30 is ⅞ inch (2.22 centimeter) and that the end 76 of probe tip 50 is 0.03 inches (0.76 millimeter) from model board 44, the overall size and consequently the outside diameter of the added ring 30 may be calculated in a manner similar to that discussed above. Recalling again that the equation for determining the capacitance between two plates is $$C = 0.225 \times K \frac{(N-1)A}{t} \text{ picofarads} \quad (1)$$

C = capacitance in picofarads
K = the dielectric constant between the plates
A = the area in square inches of one plate
N = the number of plates and
t = the thickness of the dielectric in inches.

Thus, recalling that the dielectric is air and that the probe tip is 0.03 inches (0.76 millimeter) from the target object, the capacitance between the probe tip 76 and the model board may be determined as follows. Rewrite equation (1) as $$C = 0.225 \times \frac{(2-1)A}{0.03} \text{ pico farads} \quad (16)$$

Recalling that the optical probe of this example has a diameter of 0.75 inches (1.9 centimeter) and rearranging terms, equation (16) can be rewritten as $$C = (0.225) \times \frac{3.14(.375)^2}{.03}, \quad (17)$$

which reduces to $$C = 3.31 \text{ picofarads} \quad (18)$$

Therefore, to balance the capacitance between the probe tip 76 and ring 50 it is necessary that the capacitance between ring 30 and the model board 44 also be equal to 3.31 picofarads. Recalling that ring 30 is 0.5 inches (1.27 centimeters) from end 76 of probe 50 which is in turn 0.03 inches (0.76 millimeter) from model board 44 it will be appreciated that the thickness t of the dielectric in equation (1) is equal to 0.53 inches (1.35 centimeter) and consequently the area of added ring 30 can be determined by substituting these values into equation (1) to obtain $$3.31 = 0.225 \times \frac{A'}{0.530} \quad (19)$$

Simplifying and rearranging terms, equation (19) reduces to $$A' = 7.796 \text{ square inches (50.3 square centimeters)} \quad (20)$$

Now, recalling that the probe is approximately 0.75 inches (1.9 centimeters) in diameter it is seen that ring 30 must have an inside diameter which will fit over the 0.75 inch diameter probe. Therefore, assuming a 0.875 inch (2.22 centimeters) inside diameter the outside diameter of the ring 30 may be determined by the equation $$A' = \pi D^2/4 - \pi d^2/4 \quad (21)$$

which reduces to $$A' = 0.7854(D^2 - d^2) \quad (22)$$

Substituting the value of A' from equation (20) and 0.875 as the value of the inside diameter (d), equation (22) becomes $$7.796 = 0.7854[D^2 - (0.875)^2]. $$

Simplifying and rearranging terms equation (23) becomes $$D = \sqrt{10.6917}, \qquad (24)$$

and therefore $$D = 3.269 \text{ inches (8.30 centimeters)}. \qquad (25)$$

Figure 10:
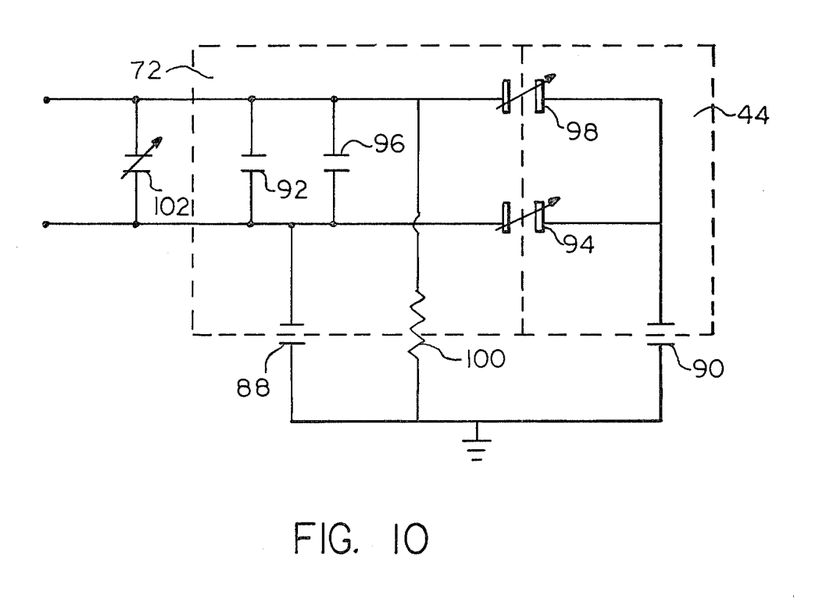
FIG. 10 shows the equivalent capacitive circuit of the system of FIG. 7.

Referring again to FIG. 7, there is shown capacitor 88 in dashed lines which represents the capacitive coupling of the probe tip 50 to earth ground. Similarly, capacitor 90 is representative of the capacitive coupling between model board 44 and earth ground. There are, of course, other capacitance that exist in this embodiment. These capacitances are represented by dashed lines on the drawing and include the capacitance 92 between probe case 52 and head assembly 66, capacitance 94 between probe tip 76 and model board 44, capacitance 96 between probe case 52 and added ring 30, and capacitance 98 between added ring 30 and model board 44. There is also shown an equivalent resistance 100 between chassis ground and earth ground as well as a variable capacitor 102 representing means for tuning the combination capacitive system of the embodiment for receipt by monitoring circuit 20 (FIGS. 1 and 2). FIG. 10 shows the equivalent capacitive circuitry in more traditional format. As will be appreciated by those skilled in the art and as can be seen from FIG. 10, a change in either capacitor 94 or 98 or both will result in the change of the overall capacitance value of the circuit as monitored at output terminals 68 and 70. Thus, in operation if probe 50 moves too close to an object the capacitance value of the capacitors 94 and 98 as shown in circuit of FIG. 10 changes sufficiently enough to energize a trigger or threshold circuit. The threshold circuit then provides a signal to control systems 64 (FIG. 7) which prevents the probe from hitting the object.

Figure 11:
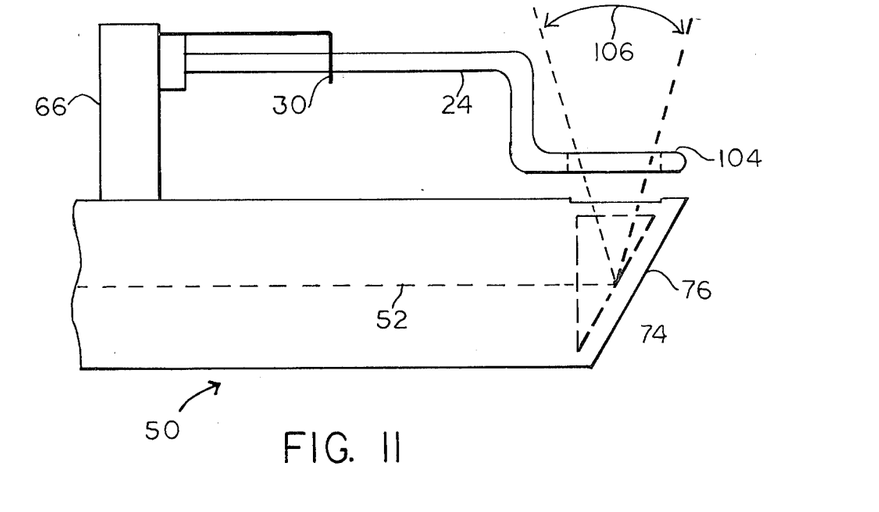
FIGS. 11 and 12 show an alternate embodiment of combining the sensing device of FIG. 4 in an optical probe used in a camera model visual system.
Figure 12:
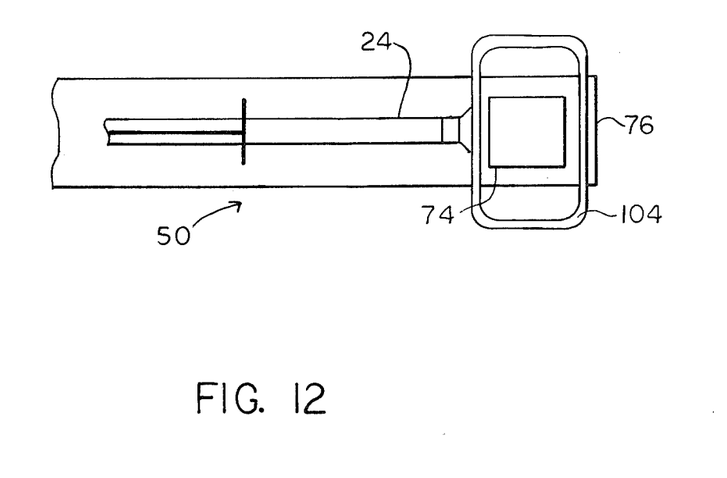

Referring now to FIGS. 11 and 12, there is shown a side and front elevation view of an alternate embodiment for modifying the probe of FIG. 6 for combining with an optical probe. According to this embodiment, the capacitive sensing probe head 66 is securely attached to the optical probe 50. However, as can be seen, capacitive sensing probe tip 24 involves a window 104 formed in its end to provide an unobstructed view from prism 74 of optical probe 50 as is indicated by arc 106. It should also be noted that the probe tip 24 is bent or formed such that it is closely located to the tip 76 of optical probe 50. It should also be appreciated that the exact size of ring 30 will have to be adjusted to balance the capacitance between added ring 30 and terrain model board and the capacitance between end of probe tip 50 and terrain model board. The size of the ring may be found experimentally or by calculation in the manner as described above.

Although the present has been described with respect to specific embodiments, it is not intended that such specific references be considered limitation upon the scope of this invention except insofar as is set out in the following claims.

What is claimed is:

1. A capacitive sensing system for use in protecting the optical probe of a camera model visual system and substantially equally sensitive to metallic, non-metallic, small and large target objects, comprising:

an optical probe of the type used in a camera model visual system;
   a terrain model board having means to define said small and large target objects as being structures and contours;
   a control system for controlling movement of said optical probe relative to said terrain model board;
   a capacitive sensing device having a sensing element fabricated from an electrically conductive material; monitoring circuitry electrically connected to said sensing element of said capacitive sensing device for monitoring changes in the capacitance between said sensing element and said target objects;
   a toroidal-shaped capacitance modifying element fabricated from an electrically conductive material;
   means to support said modifying element in an electrically insulated manner relative to said sensing element, and located with respect to said sensing element such that said capacitance between said sensing element and said target objects is substantially equal to the capacitance between said capacitance modifying element and said target objects when said capacitance sensing device is at a preselected distance from said target objects; and
   wherein said monitor circuitry provides a signal to said control system when said optical probe moves closer than a preselected distance to a target object.

2. The capacitive sensing system of claim 1 wherein said sensing element is an elongated member having a predetermined cross-sectional area and having a first end portion and a further end portion.

3. The capacitive sensing system of claim 2 wherein said toroidal-shaped member defines an opening having a cross-sectional area greater than the cross-sectional area of said elongated member, said toroidal-shaped member being disposed around said elongated member and at a spaced location therefrom between said first and further end portions of said elongated member.

4. The capacitive sensing system of claim 2 wherein said optical probe is attached to said capacitive sensing device; and wherein said elongated member is said optical probe.

5. The capacitive sensing system of claim 2 wherein said elongated member defines an aperture such that the view of said optical probe is unobstructed.

* * * * *